April 4, 1961  R. E. MORSE ET AL  2,977,627
ELECTRICAL STUNNING OF ANIMALS
Filed April 24, 1959

INVENTORS
Roy E. Morse
BY Fred A. DiPasquale
Holcombe, Wetherill & Brisebois
ATTORNEYS

United States Patent Office 2,977,627
Patented Apr. 4, 1961

2,977,627
ELECTRICAL STUNNING OF ANIMALS
Roy E. Morse, New Brunswick, N.J., and Fred A. Di Pasquale, Chicago, Ill., assignors to Reliable Packing Company, Chicago, Ill., a corporation of Illinois Filed Apr. 24, 1959, Ser. No. 808,812
2 Claims. (Cl. 17—1)

This invention relates to the electrical stunning of animals, particularly large animals, such as hogs, sheep and cattle, prior to slaughtering.

Heretofore in the electrical stunning of animals the current has been applied by means of tongs having electrodes on their inner ends which are forced against the animal by a closing action and require both hands of the manipulator. These prior devices have also been difficult to apply without the animal being conscious that it is about to be gripped in a closing device, which causes panic in the animal and makes the electrical stunning far more difficult.

It is an object of the present invention to apply electrical current to an animal in such a manner as to stun the same.

It is a further object of this invention to have an activated device so constructed that the operator thereof can handle it with one hand.

It is a still further object of this invention to have an electrical applicator device that can be applied to the animal without the animal being conscious of the approach of the applicator.

The various features of novelty which characterize this invention are pointed out with particularity in the claims annexed to and forming part of this specification. For a better understanding of the invention, however, its advantages and specific objects obtained by its use, reference should be had to the accompanying drawings and descriptive matter in which have been illustrated a preferred embodiment of the invention.

Figure 1:
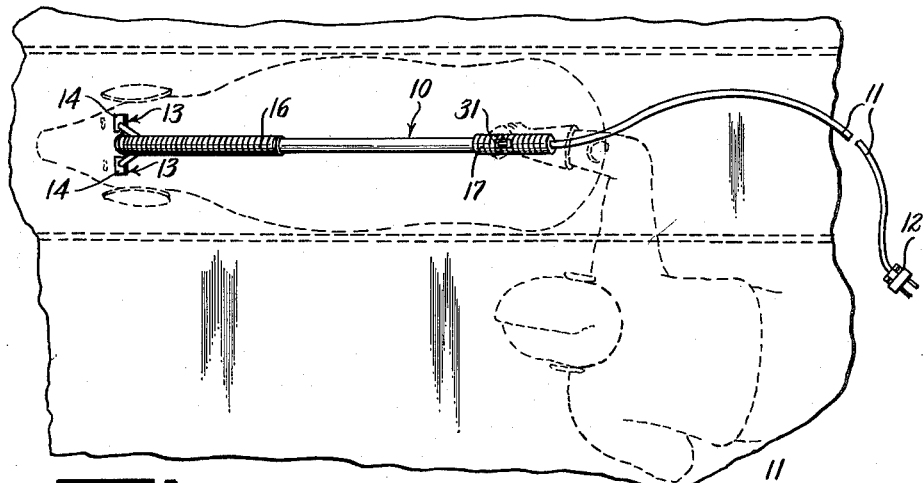
Fig. 1 is a top plan view showing an application of the improved animal stunning device.

In the electrical stunning of animals preparatory to slaughter it has been found desirable to provide a device that will allow the operator to apply the electrodes to the animal preferably from behind, as shown in Fig. 1.

Figure 2:
Fig. 2 is an enlarged side elevation, partially broken away, of the device of Fig. 1.

The device comprises a long tubular member 10, shown in Figs. 1 and 2. The form of this device is generally in the shape of a crook having a returned end and with the applicators 15—15 thereon. This provides a handle portion 9 and a returned portion 8 so that the operator has complete control over the application of the later described electrodes. This member is hollow and is made of a non-conducting material such as methacrylate or some other form of thermo-plastic synthetic resinous material that is rigid enough to hold its form after being bent into shape, as shown in Fig. 2. However it may be made of a sturdy conducting metal provided it is properly grounded. The electrical leads 11 are connected by means of the connector 12 to the source of current. These leads are contained within the hollow tubular member and are connected to the electrodes 13, 13 which are rigidly mounted at the end of the tubular member 10, as shown in Fig. 2. A switch 31, shown in Fig. 2, may be placed in the handle portion to control the flow of current in the leads 11. These electrodes are connected to the electrical leads 11 and comprise rigid metal plates 14, 14 having pointed applicators 15, 15 thereon. Additional insulation may be applied such as electrician's tape or any other suitable insulation as shown at 16, near the electrode end of the applicator and at 17 near the handle end of the applicator. The insulation also serves the purpose of providing a gripping surface which may be used by the operator to provide better control of the applicator.

Figure 6:
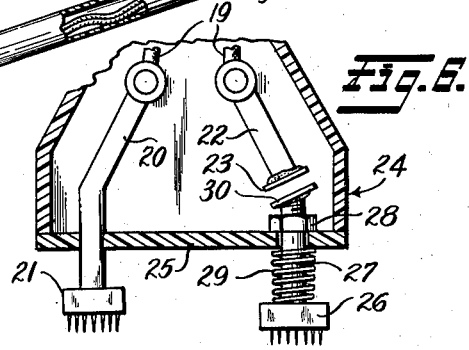
Fig. 6 is an enlarged fragmentary sectional view on line 6—6 of Fig. 5.
Figure 5:
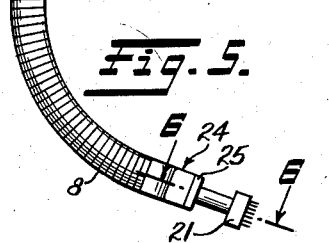
Fig. 5 is a fragmentary side elevation of a sunning device illustrating a modified form of electrode.

A second modification of this device is shown in Figs. 5 and 6, the tubular body is identical with the body 10 shown in the first modification. The head of this applicator is spread so that one of leads 19, 19, shown in Fig. 6 is connected by means of a rigid metal connector 20 through the end of the plastic applicator to the electrode 21 having the same needle-like applicator as shown in the first form on the face thereof. The second lead 19 has the lead 22 connected to the face plate 23 which is rigidly mounted within the spread end 24 of the device. Mounted in the plate 25 across the end of the device is the second electrode 26 having the same needle-like applicator or applicators on the end thereof. This plate 25 supports the shaft 27 which is journalled in the bearing 28 and is spring loaded by means of the spring 29. The shaft 28 has on its inner end the plate 30.

Figure 3:
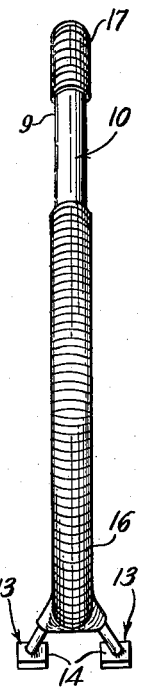
Fig. 3 is an end elevation of the device as viewed from the left of Fig. 2.
Figure 4:
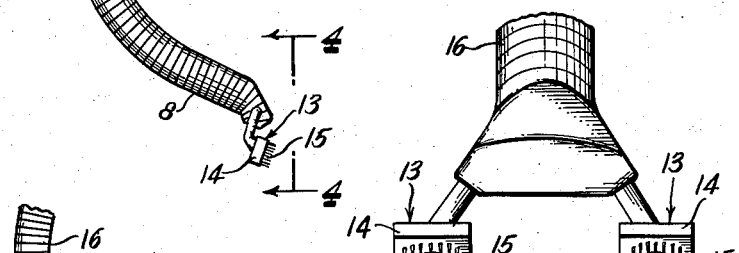
Fig. 4 is an enlarged fragmentary end elevation looking in the direction of the arrows 4—4 of Fig. 2.

The animal, as shown in Fig. 1 may for convenience be driven into a restraining enclosure and the operator approaches the animal from the rear in order to prevent panic in the animal. The applicator of the type shown in Figs. 2 and 3 is then applied separately to the head of the animal which causes immediate unconsciousness, due to the current flow in the brain portion between the electrodes 13, 13.

When the second modification of the device is used the animal is in the same position as shown in Fig. 1 and the applicator shown in Figs. 5 and 6 is applied to the head of the animal, the shaft 27 moves against the spring biasing means and forces the plate 30 against the plate 23 and closes the circuit, stunning the animal. These plates 30 and 23 are plated so as to provide good electrical contact.

While in accordance with the provisions of the statute the best forms of embodiment of this invention have been illustrated and described, it will be apparent to those skilled in the art that changes may be made in the forms of the apparatus disclosed without departing from the spirit of this invention as set forth in the appended claims and that in some cases certain features may be used to advantage without a corresponding use of other features.

What is claimed is:
1. An instrument for electrically stunning animals having a tubular member having a straight handle portion at one end thereof and a returned end portion at the other end thereof, said tubular member having electrical leads therein and having two electrodes mounted in the returned end portion thereof, one of said electrodes being fixed and connected to one of said leads; a second lead having connected thereto a stationary contact means and the other of said electrodes being movable, biasing means associated with said other electrode so as to retain it in an extended position, said other electrode having a contact means on its inner end which will close the circuit when forced rearwardly against the biasing means thereby contacting the first mentioned contact means.

2. A device as claimed in claim 1 having at least one needle like protuberance on the surface of each electrode.

References Cited in the file of this patent

UNITED STATES PATENTS

| | | |
|---|---|---|
| 1,935,138 | Windisch | Nov. 14, 1933 |
| 2,253,315 | Andrus | Aug. 19, 1941 |

FOREIGN PATENTS

| | | |
|---|---|---|
| 50,631 | Norway | Apr. 11, 1932 |
| 567,355 | Germany | Dec. 30, 1932 |
| 585,908 | Germany | Oct. 12, 1933 |